INVENTORS
LAWRENCE C. HOAGLAND
FRANCIS de WINTER
BY
Blair & Buckles
ATTORNEYS

INVENTORS
LAWRENCE C. HOAGLAND
FRANCIS de WINTER
BY
Blair & Buckles
ATTORNEYS

United States Patent Office 3,365,944
Patented Jan. 30, 1968

3,365,944
ADIABATIC CALORIMETER
Lawrence C. Hoagland, Concord, and Francis de Winter, Cambridge, Mass., assignors to Dynatech Corporation, Cambridge, Mass.
Filed Sept. 13, 1965, Ser. No. 486,849
20 Claims. (Cl. 73—190)

This invention relates to a quantitative adiabatic calorimeter that can provide relatively accurate data regarding the thermal properties of a test material over a wide temperature range with relatively little operating cost and time.

In an adiabatic calorimeter of the present type, a sample of the material being investigated is held in a sample unit having a main heater that heats the sample. The sample unit is contained within an adiabatic shield maintained at essentially the same temperature as the sample unit.

It is an object of the invention to provide an instrument for determining the specific heat of a sample and characterized by relatively high accuracy when the quantity of heat in the sample is being changed continuously at a relatively rapid rate.

A more specific object of the invention is to provide an improved quantitative adiabatic calorimeter for continuous operation over a relatively wide range of sample temperature in a relatively short time.

A further object of the invention is to provide an improved structure for maintaining a sample in a calorimeter at an essentially isothermal condition at any instant throughout a period of continuous operation.

Another object of the invention is to provide an adiabatic shield and sample unit structure for an adiabatic calorimeter and characterized by a relatively small temperature difference between the sample unit and all inner surfaces of the shield throughout a period of continuous operation.

It is also an object of the invention to provide an improved sample unit structure for containing and heating a fluid test sample in an adiabatic calorimeter.

A further object of the invention is to provide an improved sample unit for solid and thermoplastic samples.

A more specific object is to provide such sample units characterized by low radiant heat loss from the sample.

Another object of the invention is to provide a specific heat measuring system for continuous operation and characterized by relatively high accuracy. It is also an object to provide such a system that is economical to operate in that it provides data at a relatively rapid rate and requires relatively little operator time.

A further object of the invention is to provide an adiabatic calorimeter and components thereof having the foregoing features and further characterized by ease in operation and maintenance.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Considered briefly, the present calorimeter has an adiabatic shield constructed with relatively thick walls in such a manner that the inner surfaces are essentially isothermal at all times. Further, the electrical conductors energizing, instrumenting and supporting the sample unit within the shield have essentially the same temperature as the shield inner surfaces to diminish conduction heat loss from the sample unit.

The sample units provided by the invention fully enclose the sample to preclude radiation heat losses and to heat the sample at all its external surfaces.

The invention also provides improved instrumentation for the calorimeter for operating it with relatively high accuracy without continued operator attendance.

As a result of these and other features described below in detail, the present calorimeter is capable of continuous operation with relatively high accuracy over a temperature range that illustratively can extend from the temperature of liquid nitrogen (−300° F.) to an elevated temperature such as +700° F. in a relatively short time, such as one day.

With the conventional drop calorimeter technique of the prior art, measurements at only two or three different temperatures can be made in a day. Thus, weeks and even a month are required to obtain sufficient measurements to provide the complete enthalpy characteristics of the sample. The time and labor costs of the resultant data are therefore high.

The calorimeter of the present invention, on the other hand, is capable of providing the same data with an accuracy generally of around 2%, in a day or so with only a few hours of operator time.

Figure 1:
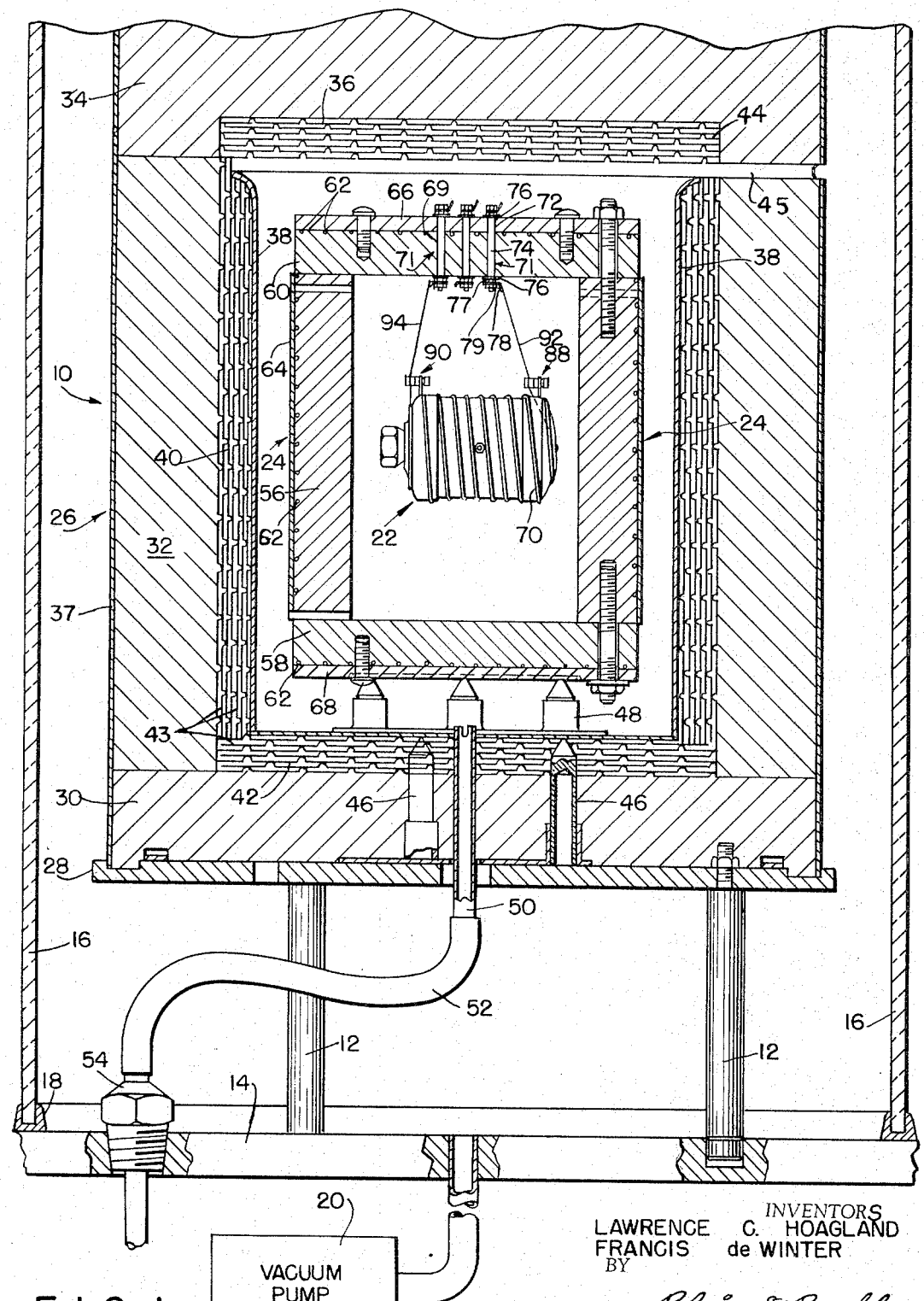
FIG. 1 is a side elevation view, partly broken away, of a calorimeter embodying the invention.

Turning now to FIG. 1, the calorimeter has a test section indicated generally at 10 mounted on columns 12 of thermal insulating material above a vacuum base plate 14. A bell jar 16, sealed to the vacuum base plate 14 with a gasket 18, encloses the test section 10 and a conventional vacuum pump indicated at 20 is connected through the base plate to maintain the interior of the bell jar at a reduced pressure.

Within the test section 10, a sample unit indicated generally at 22 for fluid samples is suspended within an adiabatic shield indicated generally at 24 disposed within an insulated container indicated generally at 26. The illustrated container 26 has a bottom thermal insulating blanket 30 resting on an elevated base plate 28 that is supported on the columns 12. A cylindrical insulating blanket 32 rests on the bottom blanket 30 and in turn is covered with a top insulating blanket 34 formed with a recess indicated at 36. A belt-like wrapping band 37 can be used to support the insulating blankets. Where the vacuum pump is of the diffffusion type so as to substantially eliminate heat conduction through the space between the calorimeter elements, the blankets 30, 32 and 34 can be eliminated.

The inner element of the insulated container 26 is a beaker 38 preferably of stainless steel and having a highly reflective inner surface. Sandwiched between the beaker 38 and the insulating blankets 30, 32 and 34 are multiple-layer radiation shields, also preferably of stainless steel. Thus, a cylindrical radiation shield 40, between the side walls of the beaker 38 and the cylindrical blanket 32, and flat, bottom shield 42, disposed between the bottom of the beaker and the bottom insulating blanket 30, are formed of stacked, highly reflective layers 43. The shield 40 can merely rest on the shield 42 or, where desired, can be secured to it in any convenient manner. As shown in FIG. 1, the layers 43 of the radiation shields are formed with projections in the form of dimples to maintain spaces between them.

A similar radiation shield 44 is secured in the recess 36 in the top insulating blanket 34 above the open beaker 38. Thus, the insulated container 26 forms a complete enclosure of conduction insulation and radiation shielding except for vent, feed-through and support holes, such as the hole 45, that pass through the radiation shields and the insulating blankets between the interior of the bell jar 16 and the interior of the container 26.

Upstanding supports 46, preferably of hollow ceramic material to minimize heat conductivity, support the beaker 38 above the base plate 28, thereby preventing the flat radiation shield 42 and the bottom insulating blanket 30 from being unduly compressed by the weight of the beaker and its contents. The supports 46 extend through clearance holes in the blanket 30 and the shield 42.

With further reference to FIG. 1, the calorimeter test section 10 can be refrigerated by filling the beaker 38 therein with a refrigerating medium such as liquid nitrogen through a filler tube 50. The tube 50 extends upwardly through suitable clearance holes in the plate 28, insulating blanket 30 and radiation shield 42; it is sealed to the bottom of the beaker 38 around an aperture therein to prevent leakage of refrigerating medium. The liquid nitrogen is applied to the filler tube 50 through a hose 52 connected at its other end to a feed-through coupling 54 passing through the vacuum base plate 14 for connection to a supply. After the test section 10 has been cooled down, any liquid nitrogen remaining in the beaker 38 can be drained out through the tube 50.

The purpose of the arrangement of the beaker, the radiation shields and the insulating blankets in the insulating container 26 can now be appreciated; the radiation shields are adjacent the beaker 38 so that in the event the bell jar 16 must be removed when the test section is refrigerated, any atmospheric frost will be confined to the walls of the beaker 38 and the radiation shielding. There will be no frost on or in the insulating blankets. This is highly desirable because when frost forms on the insulating blankets, considerable pumping is required later to achieve the desired vacuum within the bell jar 16.

The adiabatic shield 24 is constructed with a hollow cylindrical body 56 closed at the bottom with end plates 58 and at the top with end plate 60. All three components 56, 58 and 60 are uniformly grooved to receive electrically-insulated heater wires 62, preferably of a resistive material having a low temperature coefficient of resistance. A heat transferring cement is applied to the grooves before inserting the heater wire to ensure a good thermal connection between the heater wire and the elements 56, 58 and 60. A cylindrical cover plate 64 encloses the cylindrical body 56 to maintain the heater wire therearound securely in place. Similarly, cover plates 66 and 68 respectively are secured to the outer surfaces of the end plates 60 and 58. The plate 64 can be thought of as a wrap. The plates 64, 66, 68 are not required to be thermally conductive; the illustrated plates are of metal, specifically copper.

The shield 24 is made of a high conductivity material such as copper to ensure that the interior surface of the shield is isothermal at all time. Moreover, the body 56 and the end plates 58 and 60 are of considerable thickness to enhance temperature uniformity on the inner surface, e.g. a cylindrical body 56 having a six-inch outer diameter typically has a wall thickness of one inch. Additionally, the elements 56, 58, 60, 64, 66 and 68 are protectively plated on their surfaces that contact other elements to avoid oxidation of the copper. Finally, the inner surfaces, facing the sample unit 22, are highly polished to provide substantial reflectivity, that is, to provide low emissivity, and thereby reduce radiation heat transfer between the shield 24 and the sample unit 22.

Heat flow among the elements of the adiabatic shield is enhanced by assembling them with threaded fasteners of considerable diameter and length as shown.

The heater wires 62 imbedded in the cylindrical body 56 and the end plates 58 and 60 are preferably in series or otherwise arranged to have the same current. In this way, the heat input per unit mass is essentially the same for all shield elements. The heater wires are brought out of the insulated container 26 with insulated conductors passing through one of the ventilating holes 45. Conventional feed-through terminals (not shown) are then used to conduct the heater wire connections through the vacuum base plate 14 to a supply of heater current for the adiabatic shield.

As also shown in FIG. 1, heater current is supplied to the heater wire 70 on the sample unit 22 by conductors 92 and 94 connected between two feed-through connectors 71 in the top of the adiabatic shield 24 and terminals 88 and 90 on the sample unit. The conductors 92 and 94 also suspend the sample unit 22 from the top of the adiabatic shield. Additional electrical conductors (not shown) also pass through feed-through connectors 71 in the shield top plate 66 to connect thermocouples or other instrumentation inside the adiabatic shield 24 to measuring and control equipment. With this arrangement, the only heat conduction path between the sample unit 22 and the adiabatic shield 24 surrounding it, other than through any gas in the space between them, is along these conductors. However, they have small cross sections and thus exhibit substantial resistance to heat flow. This aids in preventing transfer of heat to and from the sample unit 22. With further reference to FIG. 1, each of these feed-through connections 71 in the adiabatic shield 24 employs an electrically conductive rod 72 threaded at each end and enclosed within an electrically insulating bushing 74. The rod and bushing assembly is inserted in an aperture 69, which is preferably dimensioned for a close friction fit with the bushing 74. With this arrangement, the bushing 74 contacts the plates 60 and 66 along its length for effective heat transfer between the plate 60 and the rod 72 within the bushing; a heat transfer cement or paste can be applied to the bushing to improve such heat flow. The bushing 74 and rod 72 therein will hence be at essentially the same temperature as the walls of the adiabatic shield which in turn are at essentially the same temperature as the sample unit 22. There will then be no appreciable heat flow along the conductors extending between the rods 72 and the interior of the adiabatic shield, so that all the heat applied to the sample unit 22 by way of the heater wire 70 heats the sample unit, as required for accurate measurements of specific heat of the sample. In fact, the above construction for the feed-through connections 71 in the top plate of the shield 24 increases the measuring accuracy by as much as 5% over prior construction.

The feed-through connections in the top of the adiabatic shield also include insulated washers 76 over the ends of each rod 72 where it extends beyond the plates 60 and 66. Suitable terminal means are then threaded on each end of the rods 72; the illustrated terminal arrangement comprises a nut 77 threaded snugly down on the washer 76; and a lug 78 clamped over the nut 77 by a second nut 79 threaded on the end of the rod 72.

Figure 2:
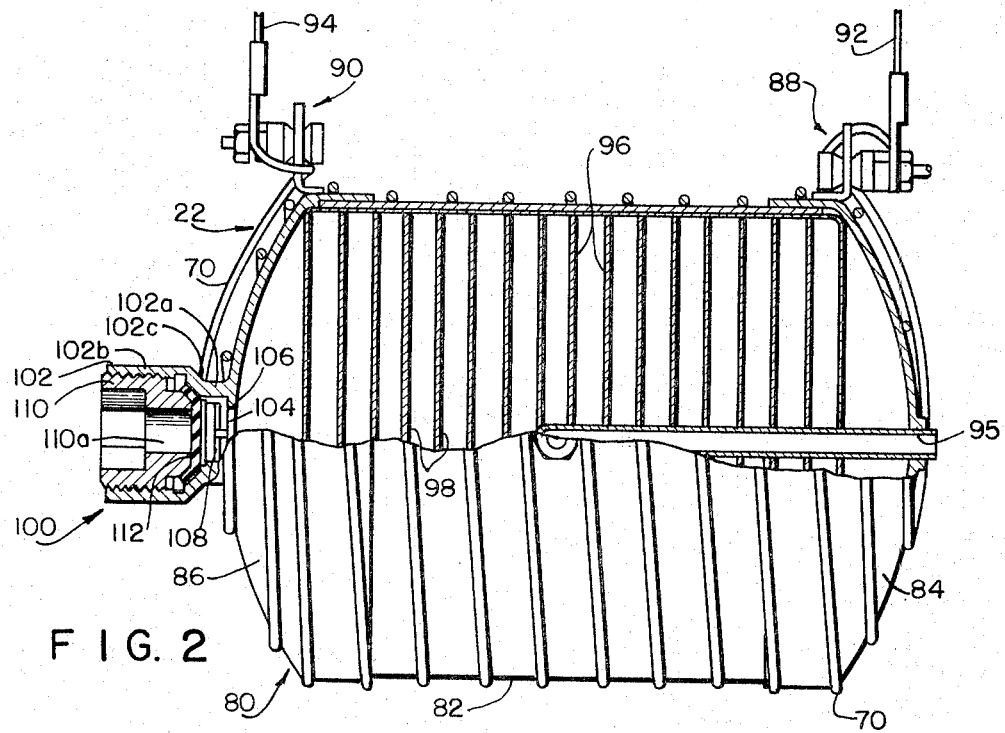
FIG. 2 is a side elevation view, partly broken away, of the liquid sample unit shown in FIG. 1.

FIG. 2 shows the liquid sample unit 22 of FIG. 1 in greater detail. The sample unit is constructed as a pressure vessel that maintains the sample therein substantially isothermal at all times with the capability of heating the liquid to elevated temperatures. With the pressure-tight construction, the entire calorimeter test section can be evacuated without subjecting the liquid sample to the reduced pressure. More particularly, the sample unit 22 has a pressure vessel 80 appropriately constructed with a stainless steel cylindrical body 82 fitted with a bottom cap 84 and a top cap 86 of the same material. The vessel 80 has a low thermal emissivity outer surface and a sheathed heater wire 70 is brazed to this surface to heat the vessel. The ends of the heater wire 70 are secured to terminals 88 and 90 mounted on the vessel 80.

A plurality of radially-extending heat conducting fins 96, appropriately of silver, are secured to the inner surface of the cylindrical body 82 of the pressure vessel 80. Also, one or two fins are secured to each of the caps 84–86. Each fin 96 has an aperture 98 through which the sample liquid can flow.

The fins 96 and the heat conductive pressure vessel 80 thus distribute the heat from the heater wire 70, with little thermal resistance, to a very large surface that is in direct contact with the liquid sample. This maintains the sample essentially isothermal at the temperature of the heated vessel body 82.

A relatively thin-walled tube 95 having a closed inner end extends to the center of the vessel 80 from the bottom cap 84 to accommodate a thermocouple junction that is to monitor the temperature of the sample within the vessel. The tube passes through the bottom cap with a pressure seal and is open for receiving the thermocouple and electrical leads, which are insulated.

The top cap 86 of the sample unit 22 has a filler plug, indicated generally at 100, constructed to operate as a safety valve in the event that the pressure differential across the vessel walls becomes too great. For this purpose the top cap 86 is formed with a collar 102 extending axially from the pressure vessel at the center of the top cap and coaxial with an opening 104 through the cap 86. The collar 102 has a short cylindrical section 102a contiguous with the end cap and an enlarged cylindrical section 102b at its end removed from the end cap 86. A frusto-conical section 102c connects the two cylindrical sections, and the inner surface of the enlarged section 102b is threaded. Also at the inner end of the smaller section 102a is an inwardly protruding flange 106.

A removable flow restrictor 108 in the form of an apertured disk or the like is disposed within the inner collar section 102a and seated against the flange 106. A stopper 110, having a through aperture 110a, is threaded into the collar 102 at the collar section 102b to clamp a sealing sheet 112 against the conical surfaces of the section 102c spanning the collar section 102a. Thus the sheet 112 seals the filler plug and also serves as a rupture disk in the event that excessive pressure difference develops across the walls of the pressure vessel 80. The sealing sheet 112 is originally in the form of a flat disk and is deformed by threading the plug 110 against mating conical surfaces of the collar section 102c. The flow restrictor 108 has an outer rim to space the sealing sheet 112 from it for the purpose of distributing the vessel pressure uniformly over the surface of the sheet 112 facing the flow restrictor.

The sample unit 22 thus provides a pressure-tight enclosure for maintaining fluid samples substantially isothermal over a wide range of readily controllable temperatures. The enclosure is convenient to open and to close and has a low-cost readily replaceable pressure seal.

Figure 4:
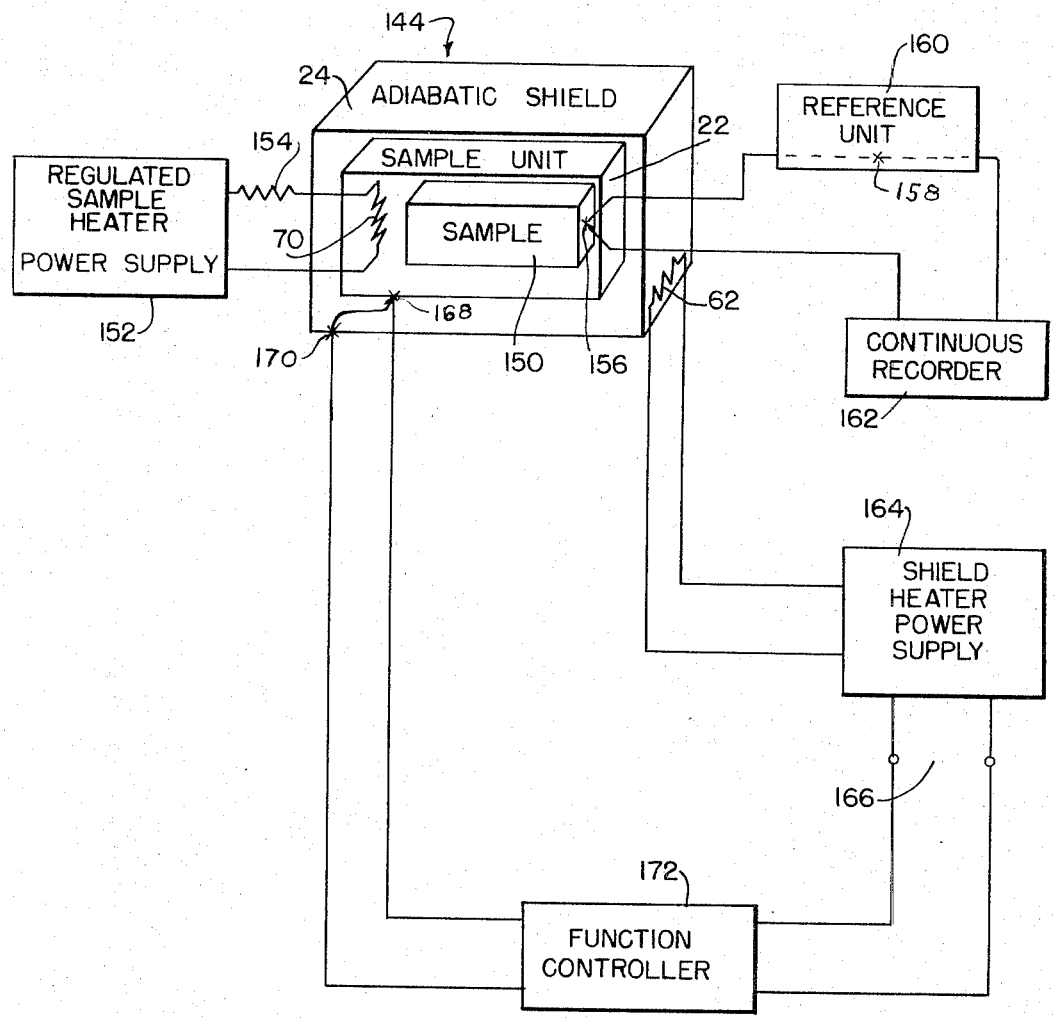
FIG. 4 is a schematic diagram of a continuously operating calorimeter system embodying features of the invention.

FIG. 4 shows a novel arrangement for automatically measuring the specific heat of a sample as a function of temperature with a calorimeter 144 of the type described above.

Considered in general, the system shown in FIG. 4 operates to deliver heat to the sample unit 22, containing a sample 150, at a constant rate. The adiabatic shield 24 is maintained at a temperature very nearly equal to the temperature of the sample unit 22, and the temperature of the sample 150 is continuously recorded as a function of time.

The shield heater 62 is operated to automatically change the rate at which it develops heat, according to the changing requirements of the system as the temperature changes. The temperature difference between the sample unit and the adiabatic shield would change during the course of a measurement because the thermal characteristics of the shield and of the sample unit and sample change differently over the temperature range of operation. The latter characteristic, overcome with the present system, would result in a substantial error in the resultant data because of the different rates of heat loss from the sample unit to the shield.

More particularly, a regulated D.C. sample heater power supply 152 is connected to apply a regulated voltage to the sample heater 70, preferably through a compensating resistor 154. The compensating resistor 154 is arranged to be at essentially uniform temperature throughout the measuring run, and its resistance is equal to the mean resistance of the sample heater 70 over the temperature range of operation. With this arrangement, the power supply 152 delivers substantially constant power to the sample heater 70 even when the resistance of the sample heater changes with the temperature somewhat.

With this mode of operating the sample heater, the specific heat of a sample can be measured continually even when the sample undergoes a phase transition, as a change of its crystal structure or a change of phase. The measurement of specific heat throughout such transition points of materials is of increasing importance today.

As also shown in FIG. 4, a measuring thermocouple has a thermoelectric junction 156 on the sample 150 and in series with a reference junction 158 maintained at a uniform reference temperature in a reference unit 160. The measuring thermocouple is connected to the input terminals of a continuous recorder 162, such as a strip chart recorder, that records the voltage developed by the measuring thermocouple as a function of time, thereby recording the temperature of the sample unit as a function of time.

A shield heater power supply 164 developing an output that is essentially continuously variable, is connected to operate the shield heater 62 according to the input signal it receives at its input terminals 166. This input signal is developed with a thermocouple junction 168 on the sample unit 22 in series with a junction 170 on the adiabatic shield 24. The potential difference between the junctions 168 and 170 is applied to a function controller 172 whose output signal is applied to the power supply input terminals 166.

The function controller 172 operates with the power supply 164 and the shield heater 62 as a feedback system to minimize the potential difference between the thermocouples 168 and 170 and thereby maintain the adiabatic shield 24 very close to the temperature of the sample unit 22. More particularly, the function controller 172 adds to the voltage between the thermocouple junctions 168 and 170 an offset voltage such that when these junctions are at the same temperature and hence develop a zero volt signal that is applied to the controller input, the shield heater power supply 164 receives from the controller a nonzero signal and hence delivers electrical power to the shield heater 62. The offset voltage is such that the power to the shield heater increases its temperature at the same rate that the regulated supply 152 increases the temperature of the sample unit 22.

However, as the temperature within the calorimeter 144 changes during an operating run, the specific heat versus temperature function of the sample unit and sample change in a manner different from the specific heat versus temperature characteristic of the shield. This differential change in the thermal characteristics of the sample unit and sample from the shield over the temperatures encountered in a measuring run, requires that the rate at which the shield heater 62 delivers heat to the shield change. For example, at the beginning of a measuring run, the thermal characteristics of the shield and of the sample unit and sample may be such that with a one-volt signal input to the shield supply 164, the supply operates the shield heater 62 at a rate sufficient to change the temperature of the shield at the same rate that the regulated supply heats the sample unit 22. As the shield and sample unit become hotter and their thermal characteristics change, the shield heater may require a two-volt input signal to operate the shield heater at the desired rate. However, when the function controller is set to apply one volt to the shield supply with a zero volt signal from the thermocouple junctions 168 and 170, the controller will require a continual error signal from the thermocouples in order to apply two volts to the shield supply. This in turn requires that the shield and sample unit be at different temperatures in order to develop the continual error signal. In this condition where there is a substantial temperature gradient between the sample and the shield, part of the heat applied to the sample unit and sample from the regulated sample supply 152 will flow to the shield, thereby causing an erroneous measurement of sample specific heat.

In accordance with the present invention, the function controller 172 corrects this error by changing the voltage offset it introduced in accordance with the amplitude of the error voltage between the thermocouple junctions 168 and 170. That is, when the adiabatic shield 24 and the sample unit and sample are at temperatures such that the shield supply requires, following the above example, a two-volt input signal, the function controller automatically responds to the error signal from the thermocouple junctions 168 and 170 to change the offset voltage so that the shield heater 164 receives a two-volt input signal when the controller receives a zero volt signal. For this purpose, the function controller 172 is constructed to respond not only to the instantaneous magnitude of the voltage between the junctions 168 and 170, but also to the integral and to the derivative of this voltage. The controller automatically changes the magnitude of the offset voltage in response to these time-dependent functions of its input voltage. (The three-function controller model MMC-B available from the Barber-Coleman Company is illustrative of a suitable controller.)

The rate at which the integrating portion of the controller samples the voltage between the junctions 168 and 170 is preferably adjustable, as are the effects of the magnitude and of the derivative of this voltage on the output signal from the controller. The controller 172 thereby operates the supply 164 to maintain the temperature of the adiabatic shield 24 at a temperature uniformly close to the temperature of the sample unit 22. In other words, the sample heater 70 and the shield heater 62 are operated to change the temperatures of the shield and the sample unit and sample at essentially the same rates even when the specific heat versus temperature characteristics of these two elements change by different amounts. In this manner, the sample, sample unit and adiabatic shield are maintained at essentially the same temperatures at every instant throughout a measuring run even when the run extends over a wide temperature range of many hundreds and even over a thousand degrees Fahrenheit. This makes it possible for data to be recorded continually, i.e., the system does not have to be held at a constant sample temperature for a duration of time to enable other elements to attain the same temperature before an accurate reading is obtained. Thus, the instrumentation, shown in FIG. 4 makes possible unattended automatic measurement of specific heat with remarkably high accuracy.

Figure 3:
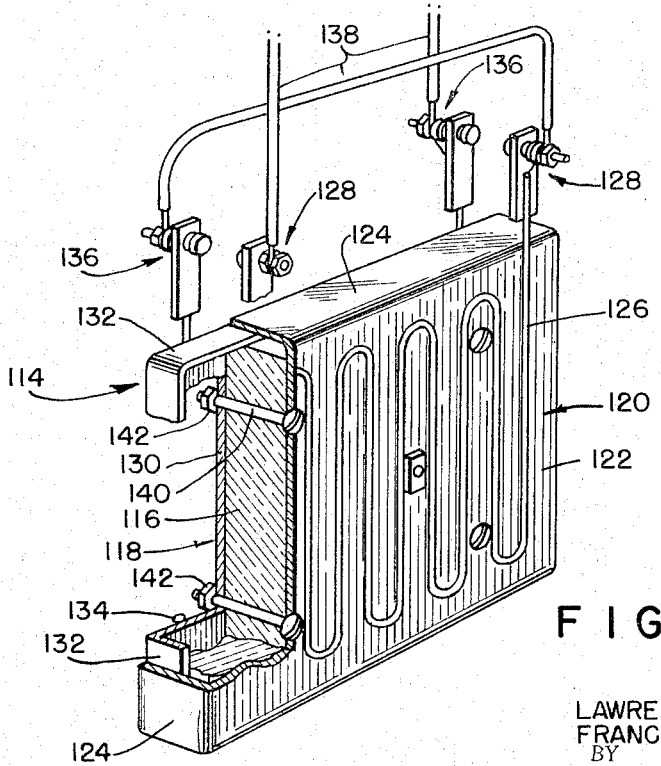
FIG. 3 is a perspective view, partly broken away, of a sample unit for solid and plastic samples embodying features of the invention.

FIG. 3 shows another sample unit, indicated generally at 114, for solid samples such as shown at 116. The sample 116 has a rectangular cross section of relatively small thickness, preferably a fraction of an inch, for optimum temperature conditions. It is completely enclosed between two interfitting pan-shaped heater plates 118 and 120.

More particularly, the plate 120 has a flat face 122 integral at its periphery with a peripheral wall 124. A sheathed heater wire 126 is hard soldered or brazed to the outer surface of the face 122 in a serpentine pattern to heat the bottom face 122 substantially uniformly. The ends of the wire 126 connect to a pair of terminals 128—128.

The mating heater plate 118 has an identical construction with a face 130 and a peripheral wall 132 that telescopically fits within the wall 124 of the plate 120 to form the closed sample enclosure. A heater wire 134, arranged on the face 130 to heat it substantially uniformly, has terminals 136—136 at its ends. The heater wires 126 and 134 are connected in a series and the heater current is supplied to them through power conductors 138—138 that suspend the complete sample unit 114 within the adiabatic shield in the same manner as shown for the liquid sample unit 22 in FIG. 1.

The heater plates 118 and 120 are of highly heat conductive material such as copper and have highly polished gold-plated outer surfaces, i.e., the surfaces to which the heater wires are secured, to minimize radiation heat transfer from the sample unit.

As also shown in FIG. 3, the sample unit 114 is assembled by clamping the heater plates 118 and 120 together with the sample 116 sandwiched between them; bolts 140 passing through the sample unit and secured with nuts 142 are appropriate for this purpose.

The sample unit 114, although designated for use with solid samples, fully encloses the sample so that it can be used with plastic and like samples provided the viscosity does not decrease to the point where the material flows freely at temperatures within the range of measurement. Thus, the interfitting pan sample unit of FIG. 3 can be used to support a sample throughout its transition from solid to plastic and highly viscous states.

A further feature of this sample unit is that like the liquid sample unit of FIGS. 1 and 2, it fully encloses the sample to present to the adiabatic shield a sample container whose external surfaces are at essentially uniform temperatures equal to the uniform temperature of the inner surface of the adiabatic shield. In this manner, the heat transfer between the sample and the adiabatic shield is minimized.

In summary, the calorimeter described above is constructed in such a manner that the sample, the sample unit and the adiabatic shield are each essentially isothermal at all times within an exceedingly wide temperature range of operation. Further the calorimeter maintains the three elements, sample, sample unit and adiabatic shield, at essentially the same temperature at all times throughout operation of the instrument. The latter feature is achieved by the calorimeter construction described above and by the novel system for operating the calorimeter, i.e. with a constant heat input to the sample unit combined with an offset voltage for the shield heater that is continually automatically reset.

The novel calorimeter adiabatic shield maintains the conductors passing through it at substantially the same temperature as the shield even when there is a large temperature difference between the shield and the calorimeter environment, i.e. room temperature. The resultant minimal temperature gradient along these electrical leads between the sample unit and the shield essentially eliminates thermal conduction loss from the sample unit.

The invention further provides a sample unit for solid samples wherein all surfaces of the sample are heated and heat transfer between sample and shield is rendered negligible.

The sample unit for liquid materials not only maintains the sample essentially isothermal at all times, but also makes possible the continuous measurement of specific heat of a material that is solid at low temperatures and becomes fluid at elevated temperatures. More particularly, such a sample can be heated to the liquid state, poured into the sample unit and then "frozen" to the solid state by reducing the temperature within the calorimeter. The specific heat of the sample can then be measured from this solid state to the higher temperatures at which it becomes liquid, including continuous measurements through the transition.

Again, the sample unit for fluid samples completely encloses the sample and has low radiation loss so that essentially no heat applied to the sample is lost to the environment of the sample unit.

As an illustration of the operation of a calorimeter system embodying the invention, the sample is heated at a constant rate sufficient to increase its temperature, except at transition points, at a rate between 1° and 5° F. per minute. The sample will then be isothermal to within around ½° F. and the adiabatic shield will be within 1° F. of the sample at all times. These temperature differences are so small as to be practically insignificant, particularly when the sample temperature is changed over a 1000° F. range.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Calorimetric apparatus comprising in combination
(A) sample-enclosing support means having an electric heater for applying heat to a sample therein,
(B) means forming an adiabatic shield
   (1) having bottom, top and side walls,
   (2) said walls being of heat conductive material with sufficient thickness to maintain the inner surfaces thereof at substantially uniform temperatures when the heat input to, and heat loss from the wall outer surfaces varies along said walls,
(C) electrical conductors extending through said walls to said electric heater and suspending said sample support within said adiabatic shield spaced from said walls thereof,
(D) electric heater wires secured to said adiabatic shield for applying heat to said walls thereof,
(E) a radiation shield
   (1) having heat-reflective walls,
   (2) containing and spaced from said adiabatic shield, and
(F) vacuum enclosure means enclosing said radiation shield for maintaining a reduced pressure within said apparatus.

2. Calorimetric apparatus according to claim 1 in which said adiabatic shield has
(A) inner walls of heat conductive material of said thickness,
(B) said heater wires recessed into the outer surfaces of said inner wall, and
(C) an outer wall of heat-conductive material contiguous with the outer surface of said inner wall.

3. Calorimetric apparatus according to claim 1 further comprising an enclosure of thermal conduction insulation disposed around the outer surfaces of said radiation shield within said vacuum enclosure.

4. Calorimetric apparatus according to claim 1 in which
(A) segments of said electrical conductors are fixed to the walls of said adiabatic shield to support said sample support, and
(B) said conductor segments are in a high heat exchange relation with said adiabatic shield walls.

5. Adiabatic calorimetric apparatus comprising
(A) sample-enclosing means having an electric heater thereon for applying heat to a sample therein, said enclosing means being in intimate contact with the sample,
(B) an adiabatic enclosure housing said sample-enclosing means and comprising enclosure-forming walls of heat conductive material of sufficient thickness to maintain the inner surfaces thereof at substantially uniform temperature when the temperature along the wall outer surfaces varies along said walls,
(C) at least first and second electrical conductors
   (1) extending through the walls of said enclosure to said heater,
   (2) electrically insulated from each other,
   (3) secured to said enclosure walls and suspending said sample-enclosing means therefrom, and
   (4) the portions of said conductors passing through said walls being arranged in a relatively close heat exchange relation with said enclosure walls, and
(D) an electric heater for applying heat to the walls of said enclosure.

6. An adiabatic enclosure according to claim 5
(A) in which said enclosure wall and heater for said enclosure are arranged with
   (1) an inner wall of said thermally conductive material of said thickness,
   (2) a resistance heater wire forming said electric heater, said heater wire being recessed into the outer surface of said inner wall and electrically insulated from said inner wall, and
   (3) an outer wall of thermally conductive material secured contiguous to the outer surface of said inner wall and urging said heater wire against said inner wall.

7. Calorimetric apparatus comprising
(A) a substantially isothermal enclosure
   (1) formed with a body member, a top member and a bottom member,
   (2) said members being of heat conductive material and having reflective inner surfaces,
   (3) said body, top and bottom members having a relatively large thickness such that the inner surfaces of said members are at substantially the same temperature when the heat input to and the heat loss from said members changes along the outer surfaces thereof,
   (4) said members having recessed outer surfaces for receiving an electrical resistance heater wire,
(B) an electrically insulated resistance heater wire arranged in the said recesses in the outer surfaces of said body, top and bottom members for delivering heat thereto,
(C) cover plates secured over said body, top and bottom members contiguous therewith and holding said heater wire in place,
(D) a sample assembly including a heater,
(E) first and second electrical conductors
   (1) secured to and passing through said top member, and said cover plate secured thereto,
   (2) supporting said sample assembly within said enclosure,
   (3) supplying electrical connections to the heater in said assembly,
   (4) said electrical conductors being electrically insulated from said top member and said cover plates and being in a high heat exchange relation therewith.

8. Thermal measuring apparatus comprising
(A) a calorimetric guard barrier,
(B) a sample holder for fluid material disposed within said guard barrier, said sample unit comprising
   (1) a pressure vessel having walls of heat conductive material, (2) an electrical heater secured to said vessel for heating said walls substantially uniformly, (3) a pair of electrical terminals secured to said vessel and connected to said heater, said terminals being arranged to electrically connect said heater to, and suspend said vessel from, electrical conductors connected to the terminals, (4) a filler opening communicating through the wall of said vessel and having a normally removable pressure-tight plug, and (5) an element of relatively high thermal conductivity extending into the interior of said vessel from the wall thereof for maintaining a fluid therein substantially isothermal, and (C) means for maintaining said guard barrier substantially at the temperature of said vessel.

9. Apparatus according to claim 8 in which said plug of said vessel has a pressure-limiting rupture seal preventing excessive pressure differential from developing across the wall of said vessel.

10. Apparatus according to claim 8 in which said thermally conductive element of said vessel comprises a plurality of heat conductive disks each secured at its outer periphery to the inner surface of said vessel wall, each disk having at least one aperture therethrough for fluid flow thereby.

11. Apparatus according to claim 8 in which said vessel further comprises a tube extending into the interior of said vessel from the outer wall thereof to be in thermal contact with fluid in the vessel, said tube having an open end communicating with the external environment of said vessel and being sealed from fluid within said vessel.

12. Calorimetric apparatus comprising (A) a pressure vessel of heat conductive material having an aperture for introducing a fluid sample to the interior thereof, (B) An electrical resistance heater secured to said vessel for heating a fluid therein, (C) a thermally-conductive heat exchange structure extending into the vessel interior from the outer walls thereof, (D) a normally removable pressure-tight plug closing said aperture, (E) means forming a passage communicating from outside said vessel to the interior thereof and sealed from fluid within the vessel, a portion of said passage being in closer thermal contact with fluid in said vessel than with the outer walls of said vessel, (F) an adiabatic enclosure, and (G) means for supporting said pressure vessel within said enclosure.

13. Thermal measurement apparatus comprising (A) a calorimetric guard barrier, (B) a heated support for maintaining a solid sample at selected thermal conditions and disposed within said guard barrier, said support comprising (1) a pair of thermally conductive shell members interfitting with each other to form a sample-supporting enclosure, (2) an electrical heater secured to each shell member for heating it, and (3) means for securing said members together with a sample enclosed within them and at least closely adjacent each shell member for high heat transfer therewith, and (C) means for maintaining said guard barrier substantially at the temperature of said shell members.

14. A heated support according to claim 13 in which said shell members are of solid material and have low emissivity outer surfaces to minimize radiation heat loss therefrom.

15. Calorimetric apparatus comprising (A) a pair of heat conductive pan-shaped members interfitting with each other to form a slab-shaped enclosure (1) said members arranged to having an adjustable interfit whereby said enclosure has adjustable thickness, (2) each member having an end panel integral with a peripheral wall that slideably interfits with the peripheral wall of the other member, (B) an electrically insulated heater wire secured to the outer surface of the end panel of each member, (C) means for clamping said members together, (D) conductor means for connecting one end of the heater wire on each member together so that said heaters are in series, (E) an adiabatic enclosure, and (F) the other ends of said heater wires being secured to said enclosure so as to suspend said support within said enclosure.

16. In a calorimetric thermal measuring system the combination comprising (A) a sample enclosure whose walls intimately contact a sample, said walls having an electrical sample heater thereon, (B) means forming a jacket around said sample enclosure and having an electrical shield heater, (C) power supply means connected with said sample heater for operating it to produce heat at a selected rate, (D) shield heater supply means connected with said shield heater and operating it in response to the electrical signal input thereto, (E) feedback means connected with said shield heater supply means and applying an input signal to said shield heater supply means, said feedback means (1) developing said heater input signal to have such a non-zero value when said sample enclosure and said jacket are at the same temperature that said shield heater raises the temperature of said jacket at the same rate as said sample heater raises the temperature of said sample enclosure, and (2) changing said non-zero value in response to differential changes in the specific heat characteristics of said jacket and of said sample enclosure and a sample therein.

17. A calorimetric system according to claim 16

(A) in which said feedback means include (1) transducing means developing an electrical voltage corresponding to the temperature difference between said jacket and said sample enclosure, (2) function controller means (a) applying to said shield supply as an input signal thereto the sum of an offset voltage of controllable amplitude plus said voltage proportional to the voltage from said transducing means, and (b) controlling the amplitude of said offset voltage in response to the amplitude of said voltage from said transducing means.

18. In a calorimetric system having an electrically heated sample unit whose walls enclose and intimately contact a sample therein and apply heat to the surface of the sample and having an electrically heated adiabatic shield, and wherein the combined specific heat of said sample and sample unit change with temperature differently than the specific heat of said adiabatic shield, the combination comprising (A) a regulated electrical power supply connected with said sample unit and delivering electrical power to it at an essentially constant rate, (B) an electrical shield heater power supply connected with said shield and delivering electric power to it according to the input signal to said shield supply, (C) temperature sensing means (1) sensing the temperatures of said sample unit and of said shield, and (2) developing a voltage whose amplitude corresponds to the temperature difference between said sample unit and said shield,
(D) a function controller
(1) connected with said sensing means to receive the output voltage therefrom, and
(2) applying to said shield supply an electrical signal developed in response to the amplitude, the time integral and a time derivative of said voltage,
(3) thereby operating said shield supply to increase the temperature of said adiabatic shield at the same rate as said regulated supply increases the temperature of said sample unit.

19. Thermal measurement apparatus comprising
(A) a calorimetric guard barrier,
(B) a sample unit
(1) disposed within and spaced from said guard barrier,
(2) having a pair of electrically heated, relatively highly thermally conductive shell members fitting together to form a box-like sample-supporting enclosure,
(C) means for supplying electrical energy to said shell members at a predetermined rate so as to heat them, and
(D) means for maintaining said guard barrier at the temperature of said shell members.

20. Thermal measurement apparatus comprising
(A) a calorimetric guard barrier,
(B) a fluid tight pressure vessel
(1) having electrically heated walls of relatively highly conductive material,
(2) disposed within and spaced from said guard barrier, and
(3) having relatively highly thermally conductive means extending into the interior thereof from the outer wall thereof for maintaining a fluid therein substantially isothermal,
(C) means for supplying electrical heating energy to said pressure vessel walls at a predetermined rate so as to heat them, and
(D) means for maintaining said guard barrier at the temperature of said vessel walls.

References Cited

UNITED STATES PATENTS 3,267,728    8/1966    Solomons _____ 73—190

OTHER REFERENCES

"Calorimeter With Automatic Control," article by Bullock, in the Journal of Scientific Instruments, vol. 36, January 1959, pp. 20–22.

"Adiabatic Calorimeter for Metals in the Range 50 to 1000° C.," article by Stansbury et al. in the Review of Scientific Instruments, vol. 30, No. 2, February 1959, pp. 121–126.

"Automatically Controlled Isothermal-Adiabatic Calorimeter," article by Hiller et al. in The Review of Scientific Instruments, vol. 33, No. 3, March 1962, pp. 323–329.

RICHARD C. QUEISSER, *Primary Examiner.*

JAMES J. GILL, *Examiner.*

C. I. McCLELLAND, *Assistant Examiner.*